Oct. 15, 1929.  M. H. GREENEWALT  1,731,772
INSTRUMENT FOR LIGHT AND COLOR PLAY
Filed Jan. 3, 1924   4 Sheets-Sheet 2

WITNESSES:
R. J. Butler
R. J. Fitzgerald

INVENTOR
Mary Hallock Greenewalt.
BY
N. M. Biebel
ATTORNEY

Oct. 15, 1929.  M. H. GREENEWALT  1,731,772
INSTRUMENT FOR LIGHT AND COLOR PLAY
Filed Jan. 3, 1924   4 Sheets-Sheet 3

WITNESSES:
R. J. Butler.
R. J. Fitzgerald

INVENTOR
Mary Hallock Greenewalt.
BY
N. M. Biebel
ATTORNEY

INVENTOR
Mary Hallock Greenewalt
BY
Busser and Harding
ATTORNEYS

Patented Oct. 15, 1929

1,731,772

UNITED STATES PATENT OFFICE

MARY HALLOCK GREENEWALT, OF PHILADELPHIA, PENNSYLVANIA

INSTRUMENT FOR LIGHT AND COLOR PLAY

Application filed January 3, 1924. Serial No. 684,162.

My invention relates to the use of light and color for expressing emotions, and particularly to a system of, and means for, light and color play.

Among the objects of my invention are the following:—

To provide a light player console having associated therewith, means for varying the intensity and the color of either one or a plurality of light sources, and having also a light and color scale to indicate to an operator the results obtained.

To provide a rheostatic means under the volitional control of an operator for permitting of light and color play in timed sequence.

To provide a relatively simple, compact, and easily actuated system for connecting and disconnecting a plurality of light sources to a suitable source of energy.

To provide an automatic system for effecting the connection to and the disconnection from a regulating resistor, of a plurality of light sources in a given sequence.

To provide a control means for a motive power that shall embody a variable timing factor under the flexible volitional control of the operator.

To provide a system for light and color play comprising a plurality of light sources and a minimum number of control and regulating means for selectively varying the color intensity of the light sources.

To provide a pedal-actuated controlling means for varying the intensity of a light source, which pedal means shall embody a resilient member to permit of obtaining a variable timing factor in said control.

In general, the object of my invention is to provide a system of light and color play that shall embody such details of construction and such structures as will permit of timed light extension, light intensity and color play with light sources under the volitional control of an operator initiated by the emotional choice or requirement and expressed through muscular feel.

It is my object, in this invention, to provide such means as will allow playing with light and color for substantially similar purposes as one plays with musical sounds or handles poetic words, for the exercise of emotional and abstract expression in time succession as well as for useful or æsthetic choice.

Though it is possible to spread sound over a wide area from a mechanism within physical reach of the individual, the light sources under similar circumstances must be distributed about the space to be illuminated, and a further object of my invention is to so construct the controlling means or the control station that, though the lamp sources be many and widely distant from each other and the operator, they and the factors which are an indispensable part of their operation, may still be handled from one place by the operator.

Since, for example, there are in electric light seven times as many red rays as blue rays, the proportioning of these colors would require in itself the use of so many lamps that it is highly advisable to make one lamp answer for many colors. The control for this operation is also effected from a single control station.

Many factors enter into the registering of successive feeling through light and color play. Besides the problems of intensity progression and timing, there is choice in quantity, quality, value, extension, and color, as well as those needs that must be classed under the conditions arising out of the illuminating material employed. All these factors interact and their interaction must be capable of being handled by one individual, the operator, for unity of expression and impression, and individuality of feeling. The various controls required should therefore be placed on a support, all of whose parts can be within easy reach of the members of the human body and accommodated thereto, and such a control location and assembly I prefer to call a console. In general I prefer to make the dimensions of this console such that the control buttons or switches located thereon will be within the convenient reach of the human arm, and will, in general, permit of the operator giving substantially his entire attention to the artistic interpretation being effected through the resilient and flexible accommodation of the mechanism to the muscular impulse, rather than to the mechanism employed.

Figure 1:
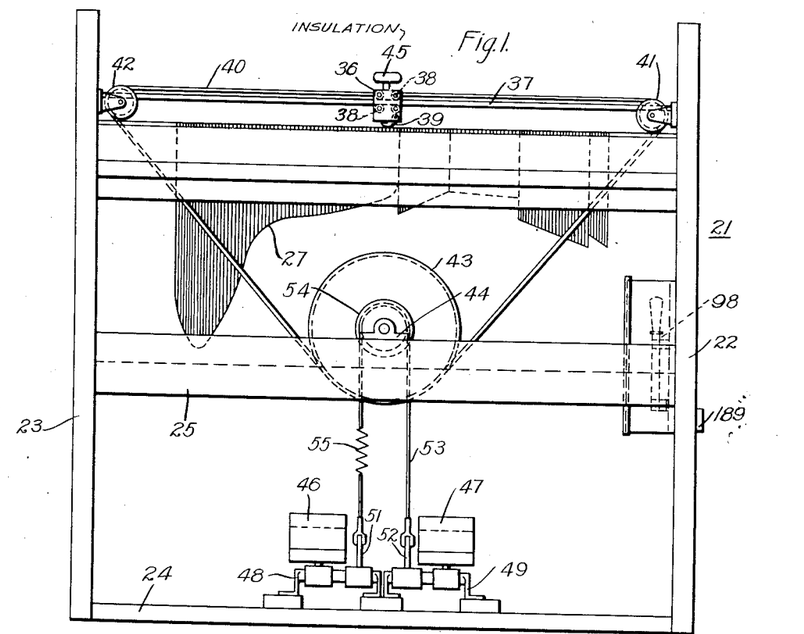
Figure 1 is a view, in front elevation, of a light player console embodying my invention, certain parts being omitted for the sake of clearness.

A light player console 21 comprises a plurality of upright side members 22 and 23 that are spaced apart a suitable distance by a base or floor member 24, an intermediate horizontally extending member 25, and a top plate 26. All of these members may be made of any suitable material, weight, durability, and electrical hazard being considered. The length of the top plate 26 is limited by the length of reach of an operator, as it is preferable that only one operator be employed and that control means, to be hereinafter described in detail, be located on said top plate where they may be easily reached and their action controlled.

Operatively associated with said console and mounted thereon in any suitable or desired manner, is a resistor member 27, that is of the type and construction disclosed and claimed in my Patent No. 1,357,773, or of a construction that will permit of varying the light intensity of a light source controlled thereby by the least perceptible increments. I have found that a suitable method for supporting the material of the resistor 27 is to mount the wires constituting the resistor on a base that may be operatively supported by the side members 22 and 23 and extend therebetween in a substantially vertical plane. Under certain conditions I may provide a plurality of such resistor members mounted in parallel-spaced relation between the side members, but, as this involves no new details I have not deemed it necessary to illustrate the same.

Figure 5:
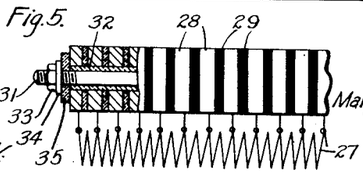
Fig. 5 is a fragmentary view, partly in side elevation and partly in section, of a portion of a commutator constituting a part of a device embodying my invention.

A commutator comprising a required plurality of relatively thin, small copper segments 28 is mounted on the console immediately above the upper edge of the resistor 27, the copper segments alternating with thin strips 29 of mica, of substantially the same surface area. The overall length of the assembled plates of copper and of mica is such as not to extend beyond the reach of the operator's arm. Each of the members 28 and 29, (see Fig. 5) is provided with a substantially central opening therethrough to permit of its being mounted on a rod 31 of a suitable metal, that is insulated from the metal segments by a tubular member 32, of electric-insulating material. A nut 33, a metal washer 34, and a washer 35, of electric-insulating material, are provided at each end of the assembled set of segments and of interposed plates of insulating material, the nuts 33 permitting of clamping all of the plates and segments in closely assembled positions on the rod 31. The number of segments employed is such as to conform to my invention as disclosed and claimed in the hereinbefore mentioned Patent No. 1,357,773, and, as illustrated more particularly in Fig. 5 of the present drawings, suitable connections are provided between the segments 28 and the resistor 27. The thickness of each segment is such also that, though the slider pause on each one a length of time sufficient to cause a light gradation to register on the comparatively slow receiving organ of the eye, it yet varies the intensity of a light source controlled thereby by amounts capable of causing the minimum perceptible variation in the intensity of such light source.

Means for varying the amount of the resistor member 27 that is included in a circuit comprise a movable slider 36 that is mounted on a slider rod 37, a plurality of roller members 38 being provided in said slider above and below the rod 37 to permit of its being moved easily and smoothly thereon. The slider 36 comprises also a resiliently mounted contact member 39, one end of which is adapted to operatively engage the upper surface of the assembled commutator hereinbefore described.

The slider 36 is moved backward and forward relatively to the hereinbefore described commutator by hand or by a flexible chain or cord 40, the ends of which are connected to the slider 36 and is led over pulleys 41 and 42 mounted, respectively, on the side members 22 and 23, and over a relatively large, grooved pulley 43 that may be suitably supported by the intermediate member 25. A plurality of suitable bearing members 44 may be provided to permit of free and easy turning movement of the pulley 43 therein, the latter being mounted on a suitable shaft. A handle 45, of electric-insulating material, is secured to the slider 36 to permit of moving it by hand whenever desired.

Means for effecting a turning movement of the pulley 43 comprises a pair of pedal members 46 and 47 that are pivotally mounted on shaft bearings 48 and 49 respectively, that are suitably supported on the base member 24, as is illustrated more particularly in Fig. 1 of the drawings. The pedal members 46 and 47 actuate lever members 51 and 52 respectively, that have one end secured to the shaft bearings 48 and 49 respectively, and have their other ends connected to the ends of a flexible chain or rope 53 that operatively engages a portion of the peripheral surface of a small grooved pulley 54 that is mounted co-axially with the large pulley 44 and on the same supporting shaft to turn therewith. A spring member 55 comprises a part of the flexible chain or rope 53, not only to assure that the rope will always be tight on the pulley 54, but also to provide a resilient connection between the operating pedal members 46 and 47 and the pulley 54, and further to introduce or provide a variable factor in the manual operation that will give the effect of feel or touch as these terms are ordinarily employed in playing a key-played instrument.

Figure 3:
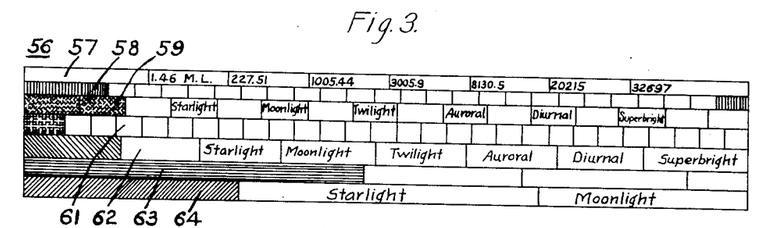
Fig. 3 is a top plan view of a light and color scale mounted on the console.

As it is highly desirable that the operator of a light player console of the hereinbefore described construction have recordable means for the light and color intensities obtainable by the use of the apparatus, I provide a light intensity and color scale 56 that is located on the upper surface of the top plate 26 immediately back of the slider 36, a part of which may be developed as a pointer or indicating arm if so desired. The scale 56 is preferably worked out in a plurality of relatively narrow and parallel extending bands 57, 58, 59, 61, 62, 63, and 64, that are painted in the following colors:—white, red, orange, yellow, green, blue, and violet. This list of colors is not fixed but may be varied as desired, although of course, there will always be a plurality of such colors and color scale bands in accordance with the number of colored lights or means for coloring lights that may be provided.

On each of the colored bands I may stencil or print an arbitrary list of terms of color brightness and such a list is illustrated in Fig. 3 of the drawings as comprising the terms "no erg", or darkness, and then "starlight", "moonlight", "twilight", "auroral", "diurnal", and "superbright". These terms are intended to guide an operator quicker than he could count each of the many gradations individually, and this scale will, of course, be variable as to position on the different bands of color on the composite color scale, for the reason that the different color rays in artificial light as at present developed is fixed, consisting of about one of violet to three of blue, to seven of green, to fourteen of yellow, to twenty-one of red. The band 57, it may be noted, is for white light and such white light may be employed to vary the tint of any color. Different shadings of the same color may be obtained by varying the intensity of the light traversing a colored screen.

The numerals marked on the white band 57 represent milli-lamberts of illumination and indicate that the design constants of the rheostat comprising the resistor 27 have been so worked out in co-operation with the light sources that are to be used therewith that a given position of the slider will result in an illumination value expressed in milli-lamberts that is found directly in front of the slider, and the combination of electric resistor and slider, in conjunction with suitable ray filtering, constitute an absolute measure for color shade and for color tint.

Figure 4:
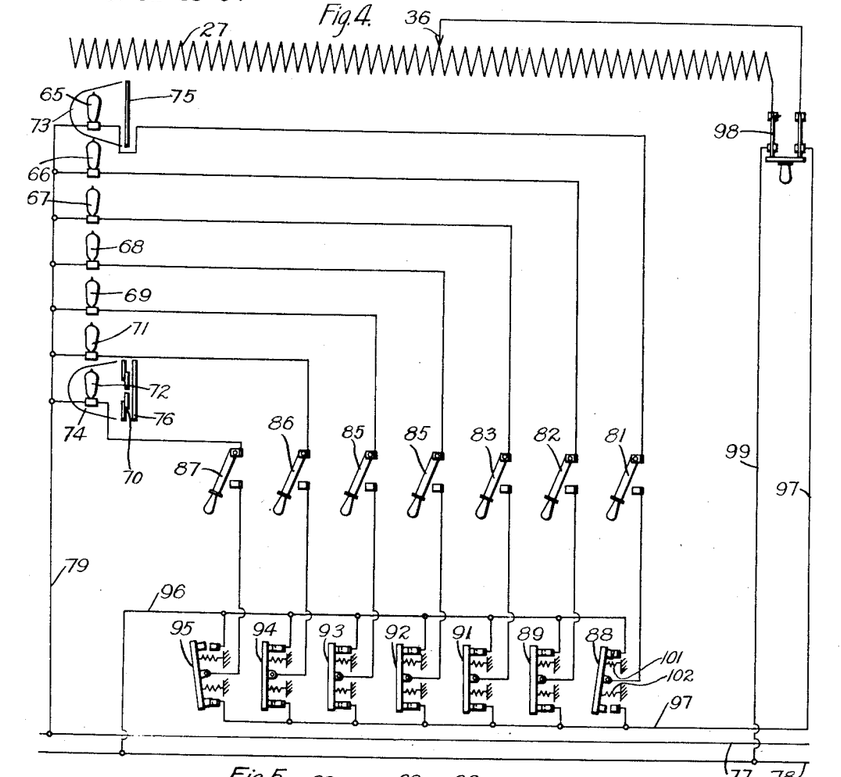
Fig. 4 is a schematic diagram of connections employed with the device embodying my invention.

Fig. 4 of the drawings illustrates schematically a diagram of connections that I employ with the adjustable rheostat 27 and the slider 36 to permit of bringing up the intensity of a plurality of lamps, one after the other, from zero to full brightness or to reduce the intensity thereof successively, from full brightness to zero. A plurality of lamps 65, 66, 67, 68, 69, 71, and 72 are illustrated and are intended to represent either individual lamps of any desired candle power or a bank of such lamps of any desired number or respective intensities. Any or all of the lamps may be provided with a suitable reflector such as is indicated by the numeral 73 associated with the lamp 65 and the reflector 74 associated with the lamp 72. The lamp 65 and the reflector 73 are provided with a color screen 75 and the lamp 72 and reflector 74 are provided with a color screen 76. The reflector 74 of the lamp 72 is provided with an adjustable diaphragm 70, comprising relatively fixed and movable members and substantially similar, in construction and operation, to the iris diaphragm of a photographic camera and effective to vary the size of a beam of light traversing the screen 76. As above stated, all of the lamps may be, and preferably are, provided with reflectors, iris diaphragms, and color screens, which latter two parts are preferably movable, and under the volitional control of the operator by means to be hereinafter described.

A supply circuit comprises conductors 77 and 78 and one terminal of each of the light sources is connected to the conductor 77 through a conductor 79. A plurality of single throw switches 81, 82, 83, 84, 85, 86, and 87 are connected respectively to the other terminal of the light sources 65, 66, 67, 68, 69, 71, and 72. The other terminal of the series of switches is connected to the middle terminal of a series of plural position, rocking-tablet switches 88, 89, 91, 92, 93, 94, and 95. Each of the tablet switches is provided with a pair of spaced contacts on the rocking member that are adapted to operatively and selectively engage fixed spaced contact members of any desired type. Corresponding fixed contact members of all of the tablet switches are connected together through a conductor 96 that also connects these points to the supply circuit conductor 78. The other fixed contact members of all of the tablet switches are connected together through a conductor 97 which is connected to one terminal of a double pole single throw switch 98, the other terminal thereof being connected to the conductor 78 by a conductor 99. The other two terminals of the double pole switch 98 are connected respectively to one end of the resistor 27 and to the slider 36. The switch 98 may be located on the inner side of the side member 22 at a point convenient to the operator.

A plurality of compression springs 101 and 102 are provided for each of the tablet switches in order to maintain them in a predetermined neutral position when not actuated by an operator to an operative position. The construction of each of the tablet switches is such that when moved into engagement with either one or the other of the stationary contact members the movable bar thereof will remain locked in that position by any suitable means (not shown), until moved to the other of its operative and limiting positions, where it will be held until again moved. While the tilting member is moving from one of its limiting positions to the other, the circuit therethrough and through any device controlled thereby is not interrupted. A tablet switch may be moved to its intermediate or neutral position by a slight touch on the raised end thereof, free movement being an essential consideration of their construction.

Figure 6:
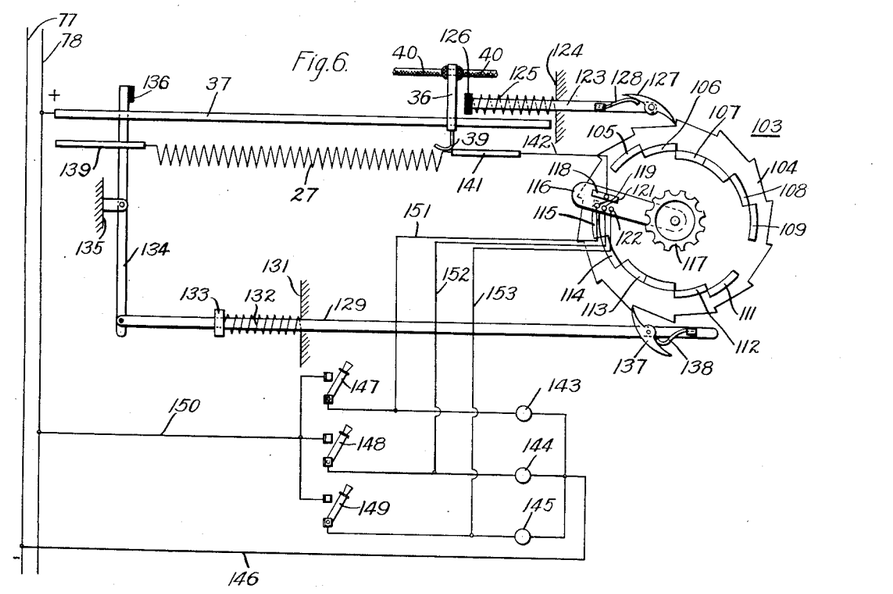
Fig. 6 is a schematic representation of a semi-automatic mechanism and diagram of connections comprising a part of my invention.

In Fig. 6 of the drawings there is illustrated what may be termed a semi-automatic control device which I may employ in place of the more simple and manually operable system illustrated more particularly in Fig. 4 of the drawings. In addition to the pedal controlled slider 36, as was hereinbefore described, I provide a ratchet switch device 103 that is suitably mounted on the console 21 at the outside thereof on the right hand side. The ratchet device comprises a ratchet wheel 104 having a predetermined number of teeth thereon in accordance with the number of circuits which it is desired to control therethrough. In the drawing I have illustrated a ratchet wheel having 14 teeth. The ratchet wheel 104 may be made of a suitable electric-insulating material and has mounted thereon a plurality of relatively narrow, concentric, arcuate, metal segments 105, 106, 107, 108, and 109. A duplicate set of these segments, numbered 111, 112, 113, 114, and 115 are located on the ratchet wheel 104 diametrically opposite the other set of segments. The segments 107 and 113 are of double the arcuate length of the other segments, and all of the segments of each set are connected together electrically. The arcuate extent of the single length segments equals that of each tooth of the ratchet 104. The segments 105, 109, 111 and 115 are located on a circle of substantially the same diameter. The segments 106, 108, 112 and 114 are located on a circle having a diameter that is smaller by twice the radial width of the segments. The segments 107 and 113 are located on a circle having a still smaller diameter. The arcuate width of the gap between the two groups of segments is equal to the width of one tooth of the ratchet wheel 104.

An arm 116 is normally maintained in a substantially fixed position by any suitable means (not shown) and has one of its ends mounted co-axially with the ratchet wheel 104. A handle member 117 is secured to the inner end of the arm 116 and is effective to move the arm 116 from its normally fixed position to any other desired fixed position here it remains until again moved by the operator.

The arm 116 is provided with a longitudinally or radially extending contact member or brush 118 that is of such width as to engage consecutively all of the contact segments which are located in three concentric annular paths, the inner periphery of an outer segment coinciding with the outer arcuate periphery of the next inner segment. The arm 116 is also provided with three radially spaced contact brushes 119, 121, and 122 that are adapted to engage the respective arcuate segments of different radii, upon relative motion of the ratchet wheel and arm.

The ratchet wheel 104 is moved by the slider 36 at the end of its travel over the hereinbefore described commutator by a plurality of pawls. An upper pawl comprises a rod member 123 that is longitudinally movable in a suitable fixed support 124 that may be a part of the light player console. The rod 123 is yieldingly held at one end of its travel by a helical compression spring 125, one end of which engages the fixed support and the other end of which engages a bumping or striking block 126, of electric-insulating material, secured to the inner end of the rod 123. A pivotally mounted pawl member 127 is provided at the outer end of the rod 123 and is yieldingly held in its proper operative position by a spring 128.

A second or lower pawl comprises a relatively longer rod 129 that is suitably mounted in a fixed support 131 which may comprise a part of the light player console. A spring 132 surrounds a portion of the rod 129 and extends between the fixed support 131 and a stop block 133 mounted on the rod. A link member 134 is pivotally mounted intermediate its ends on a suitable fixed support 135 and extends in substantially a vertical direction at the left-hand side of the light player console. The lower end of the link 134 is pivotally connected to the left-hand end of the rod 129, and the upper end carries a bumping or striking block 136, of electric-insulating material, that is operatively engaged by the slider 36. A pawl member 137 is pivotally mounted on the rod 129 adjacent to the right hand end thereof and is yieldingly held in its proper operative positon by a spring 138.

Relatively long metal bars 139 and 141 are electrically connected to the respective ends of the resistor member 27 and are located at each end thereof and extend longitudinally away therefrom. The bar 141 is electrically connected to the brush 118 by a conductor 142. Supply circuit conductors 77 and 78 are provided and the supply circuit conductor 78 is electrically connected to the metal slider bar 37.

A plurality of electric light sources 143, 144 and 145 are provided corresponding in number to one half the number of arcuate segments provided in each of the sets on the ratchet wheel 104. One terminal of each of the light sources is connected together and to the supply circuit conductor 77 by means of a conductor 146. The other terminal of the respective light sources 143, 144, 145 are connected to one terminal of single throw switches 147, 148, and 149, the other terminals of which are connected together and to the supply circuit conductor 78 by a conductor 150. The brush 119 is electrically connected, by means of a conductor 151, to one terminal of the light source 143 and to one terminal of the switch 147. The contact brush 121 is connected to the connected terminals of the light source 144 and the switch 148 by a conductor 152. The brush 122 is connected to the connected terminals of the light source 145 and the switch 149 by a conductor 153.
As economy of operation is of the utmost importance in a system of this kind, I have illustrated a modification of a slider-controlled rheostat in Fig. 7 of the drawings. It may happen at times that the single slider 36 is moved only slightly at or near one end of the rheostat and may not be moved beyond the middle point of the rheostat for a relatively long period of time in light and color play. If at one end of the commutator, the light source controlled thereby is at or near full intensity, and if at the other end of the commutator, the light source controlled thereby is at low intensity lending but a fractional color or tint influence for shorter or longer periods of time. This leaves a part of the resistor unused and the means now to be described permits of making use of this otherwise unused part of the rheostat.

Figures 7, 8, 9, 10, 11, 12, 13:
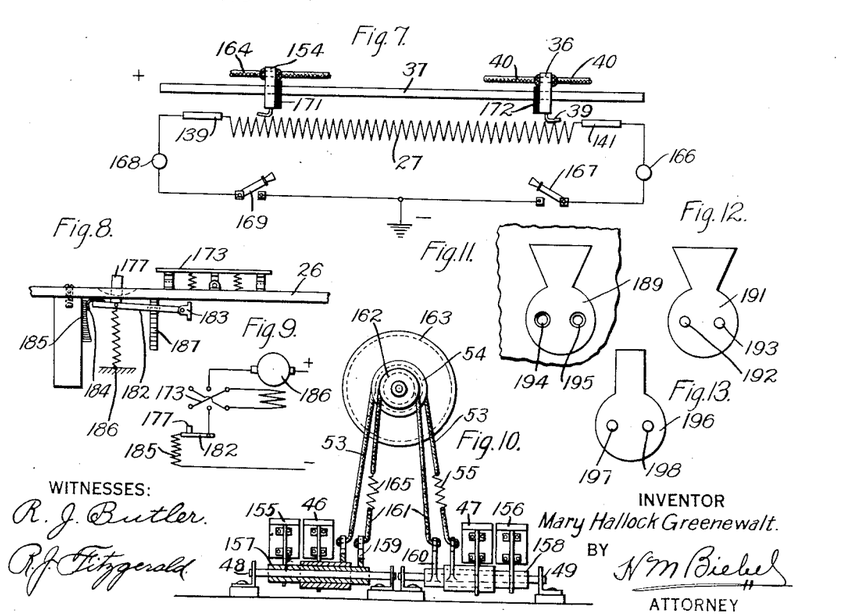
Fig. 7 is a schematic representation of a modified form of a portion of a device embodying my invention.
Fig. 8 is a view, in side elevation, of certain control devices constituting a part of my invention.
Fig. 9 is a schematic diagram of connections employed with the control devices illustrated in Fig. 8.
Fig. 10 is a view, in rear elevation with certain portions shown in section, of a modified form of a pedal device embodying my invention.
Fig. 11 is a fragmentary view, in side elevation, of a socket member adapted to be used with the device embodying my invention.
Fig. 12 is a view, in end elevation, of a plug member adapted to be used with the socket illustrated in Fig. 11.
Fig. 13 is a view, in end elevation, of a modified form of plug member.

I provide a second slider 154 that may be actuated by substantially the same means as hereinbefore described, and which means is more particularly illustrated in Fig. 10 of the drawings. An extra pair of pivotally mounted pedals 155 and 156 are mounted on tubular members 157 and 158 that are mounted on the respective shaft bearing members 48 and 49. Link members 159 and 160 have one end secured to the inner ends of the tubular members 157 and 158 respectively, and have connected to the other end thereof the ends of a flexible chain or rope 161 that runs over a small pulley 162, that actuates a larger pulley 163 over which runs a flexible chain or rope 164 connected to the slider 154. A resilient member 165 is provided in the rope 161. The construction of these parts is substantially the same as that illustrated in Fig. 1 of the drawings for a single slider. Where a plurality of resistor members are provided on the console the plural pedals may be employed for their control.

Referring again to Fig. 7, a light source 166, which may be any one of those hereinbefore described and momentarily connected in series circuit relation to the resistor 27 to permit of varying the intensity of the light produced thereby, a switch 167 being provided, as hereinbefore described in connection with the diagrams of connections of Figs. 4 and 6. A second light source 168 may have one of its terminals connected to the contact bar 139 at the other end of the rheostat and have its other terminal connected to one terminal of a control switch 169, the other end of which is connected to the other supply circuit conductor, shown schematically in the drawing as a ground connection. Bumping blocks 171 and 172, of electric-insulating material, may be provided for the respective sliders 154 and 36 in order to ensure that the two sliders will not contact with each other and thereby prevent proper operation of each other.

Figure 2:
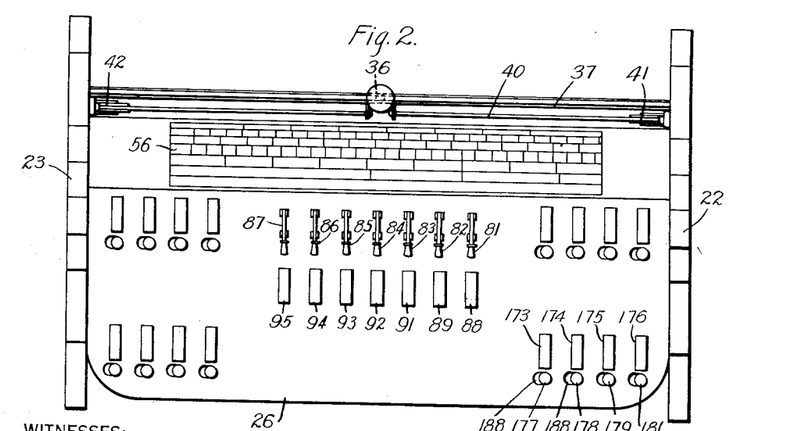
Fig. 2 is a top plan view thereof.

As it is desirable to be able to vary the direction of the light from a plurality of light sources and to effect other changes relatively thereto, I provide a plurality of sets of control switches that are illustrated in side elevation in Fig. 8 of the drawings and in plan view in Fig. 2 of the drawings. Four such sets of control switches and devices are illustrated, each set comprising four individual, tablet, plural-position switches for reversing the direction of rotation of an electric motor and four co-operating control devices that individually provide means for effecting a variable timing factor in the operation of the device controlled thereby. While I have illustrated four such sets, I do not desire to be limited to this number as any desired number of such sets of switches may be provided in accordance with the number of light sources that are to be controlled by an operator at the one light player console.

The plurality of light sources will usually be located at a distance from the operator and relatively close to the space or area to be illuminated. They severally comprise motor-operated means for moving the light source to swing the beam of light to the right or to the left, 204, Fig. 14, and motor-operated means for tilting the light source up or down 206, Fig. 14. As hereinbefore stated an iris diaphragm, 208 and 208$^a$, Fig. 15A, Fig. 14, substantially of the type employed in photographic cameras, is provided for the reflector within which a light source is located and is motor-operated to vary the size of the opening through which the light passes. A fourth motor operatively associated with the light source moves a color film, 202, Fig. 14, Fig. 14C and a fifth motor moves a lens 209, or causes a turning movement of a color wheel to vary the color of the light produced by the light source.

In accordance with the above mentioned motor-actuated movements, I provide four plural-position tablet switches in each set designated respectively by the numerals 173, 174, 175, and 176, and of such design as either to reverse the direction of rotation of a single motor controlled thereby, or to energize either one or the other of two motors where it is necessary to use two separate motors instead of a reversing motor. The tablet switches 173, 174, 175, and 176 are of substantially the same construction as those illustrated in Fig. 4 of the drawings, except that those employed to control reversing motors are provided with two contacts on the tilting member at each end thereof instead of only one. As the switch 173 is shown in side elevation only in Fig. 8 of the drawings, only one contact member is visible at each end thereof, but the two contacts are shown schematically in Fig. 9 of the drawings.

A corresponding plurality of pivotally-mounted and yieldingly-restrained lever control means are provided to cooperate with the tablet switches 173 to 176 inclusive, and the respective manually operable control buttons 177, 178, 179, and 181 are shown in Fig. 2 of the drawings. Each of these control buttons is mounted on a lever 182 that is pivotally mounted, at one of its ends, on a suitable supporting member 183 that may, in turn, be supported by and depend from the top plate 26. The other end of the lever 182 is provided with a spring contact member 184 that engages a resistor member 185, (illustrated schematically only) to thereby control the speed of a motor 186 illustrated schematically in Fig. 9 of the drawings. A compression spring 186 yieldingly holds the lever 182 in its normal inoperative and raised position. A ratchet member 187 cooperates with a portion of the lever 182 to hold it in any desired position. To release the lever from the ratchet member it is necessary to push the button or knob to one side and away from the ratchet, (the pivotal mounting being constructed to permit this) whereby disengagement of the lever from the ratchet is effected and the spring 186 returns the lever to its raised inoperative position. An elongated opening 188 is provided in the top plate 26 adjacent to each of the control buttons to permit of moving the knob laterally thereof.

The hereinbefore described construction of the control device comprising the yieldingly-restrained lever 182, provides a variable timing factor of the motive power that is under the volitional control of the operator and has substantially the same "feel" or "touch" as is obtained in musical instruments. While I have described the construction of only one set of tablet switches and of co-operating manually operable lever switches, I deem it unnecessary to describe the others as they are of exactly the same construction. I do not wish to be limited to the particular construction illustrated as other forms may be employed capable of giving the same operating results. Any desired number of sets of such control switches and levers may be provided on the top plate 26 of the console.

In Figs. 4, 6, and 7 I have illustrated a plurality of light sources that are electrically connected in series circuit relation to the resistor 27 in order that the light intensity thereof may be varied as desired by the operator. It may be necessary or advisable to vary the light intensity of additional light units, or to vary the light intensity of certain specially located light units and Figs. 11 to 13 inclusive illustrate a means to permit of the operator's identifying the light sources by touch only, in order to permit of such identification even in the dark. Fig. 11 illustrates a socket member 189 that has a predetermined configuration and that is located at some convenient point in the light player console, as for instance, at the right hand side thereof as is illustrated in Fig. 1 of the drawings. Fig. 12 illustrates a co-operating plug member 191, of substantially the same configuration, and provided with a pair of contact pins 192 and 193 respectively to which the ends of a supply circuit conductor may be connected in the usual way. The socket member is provided with co-operating terminal sockets 194 and 195, that are engaged by the pins 192 and 193 respectively, when the contact plug is pushed home in the contact socket. As the operator knows that a certain light source located in a certain position is connected to the plug member 191 having a predetermined configuration, he will be able to pick out by feel or touch alone the proper plug and insert it in the proper socket member, which may for instance, be that represented by or connected to the light source 168 in Fig. 7 of the drawings. Fig. 13 illustrates a contact plug 196 of different configuration, also provided with contact pins 197 and 198, that may be connected to another light source and the operator will be able to pick out this plug from the others by the difference in configuration thereof even though the light console be entirely in the dark at that time. The plug 191 cannot be pushed into the socket member corresponding to the contact plug 196, thereby preventing wrong connections. Other co-operating contact plugs and socket members of different configurations may be provided if necessary.

Referring more particularly to Fig. 4 of the drawings, the method of operation of the system there illustrated is substantially as follows. As before stated, the plural position tablet switches will be in either one of their limiting positions and will preferably be in the position illustrated by the switch 95 in which the light source 72 is connected to the supply circuit conductors 77 and 78 through the resistor 27. If it be desired to begin light and color play and if it be assumed that no illumination is to be provided at the beginning thereof, all of the tablet switches will be in the same position as that of switch 95 and all of the switches 81 to 87 inclusive will be open and the slider 36 will be at the left hand end of the resistor whereby all of the resistance thereof will be in a circuit established therethrough. The operator first closes the switch 98 and then the switch 87 whereby a relatively small amount of current is permitted to traverse the light source 72. By means of the pedals 46 and 47 or by hand he may move the slider 36 along the commutator, thereby varying the current traversing the light source 72 and if desired may vary the intensity of the light produced thereby in any desired manner and in timed sequence to accompany instrumental music, or vocal music, or a poetic recitation, or dancing, or he may vary the intensity according to the emotions which he desires to express irrespective of accompaniment.

As hereinbefore described, the light source 72 may be provided with a reflector 74 and a means 76 for variably coloring the light produced by the light source and the operator may, by the control means hereinbefore described, vary the direction of the rays of light, the lateral area of the light, or the color thereof, or all of them, in such timed sequence and manner as he may desire. The resilient means 55 interposed in the flexible chain 53 permits of introducing a variable timing factor in this control in the intensity of the light, and permits of the volitional control thereof by the operator.

If it be desired or necessary to increase the intensity of illumination, the light source 72 may be brought to full intensity by moving the slider 36 over to the right hand end of the rheostat 27 and the tablet switch 95 is then moved to the other of its limiting positions, whereby it places the light source 72 directly across the supply circuit conductors 77 and 78 and in parallel-circuit relation to the resistor 27. As hereinbefore stated the construction of the tablet switch is such that one circuit is closed before the previous circuit is interrupted, whereby a momentary extinguishing of the light source is prevented. The slider 36 is moved to the extreme left hand end of its travel and the light source 71 may next be connected in series-circuit relation to the resistor 27 by closing the switch 86, it being assumed (as stated above) that the tablet switch 94 is in the proper limiting position to connect the light source 71 to the rheostat. The slider 36 is again moved toward the right hand end of the rheostat, resulting in increasing the light intensity of the light source 71, which increase may be made quickly, slowly, or in any other predetermined sequence under the volitional control of the operator, and by a tilting movement of the switch 94 the light source is connected directly to the supply circuit conductors 77 and 78. As hereinbefore stated, this light source may also be provided with a reflector, with motor-operated means for coloring the light produced thereby, with motor-operated means for tilting the beam of light and for moving it to the right or left and with motor-operated means for varying the size of opening of the diaphragm in the reflector.

Additional light sources may be first connected to the rheostat in series-circuit relation and then in parallel-circuit relation as hereinbefore described, as may be desired or as may be necessary by the light and color play being given by the operator. It is also evident that any one of the light sources may be disconnected from the supply circuit conductors by substantially the reverse series of operations hereinbefore described and that two or more light sources may be connected in series-circuit relation to the resistor 27, provided always that their combined capacities do not exceed that of the resistor.

In all of this it may be noted, as has already been described, that either an integral part of the movable slider, or an arm secured thereto and moving over the light and color intensity scale, provides an electric measure for not only the color shade produced by the varying intensity of the light of a given color, but also for the color tint produced by a mixture of a given color and of white light and indicates to the operator the recordable intensity obtained.

Referring more particularly to the semi-automatic control system illustrated in Fig. 6 of the drawings the operation thereof is substantially as follows: It is assumed that the position of the various parts of the mechanism are as illustrated in Fig. 6 of the drawings and it is desired to bring the light source 143 either to full brilliancy or to vary its intensity. By means of the hand or of the foot pedals 46 and 47, he moves the slider 36 to the left hand end of the rheostat 27 and then such an amount further as will cause it to operatively engage the bumping block 136 on the upright lever 134 and move it sufficiently to cause the pawl 137 to move toward the right and operatively engage the next tooth on the ratchet wheel. When the slider is moved toward the right on the end bar 139, the spring 132 causes the rod 129 to move toward the left whereby the ratchet wheel 104 is caused to move in a clockwise direction an angular distance or amount equal to the arcuate width of one tooth, where it may be held by suitable means usually employed in the art. This angular movement causes the operative engagement of the contact brush 119 and the arcuate segment 115 and also causes the operative engagement of the wide brush 118 with the same segment 115. This establishes a circuit from the supply circuit conductor 78 through the slider rod 37, slider 36, contact member 39, through the rheostat 27, end bar 141, conductor 142, brush 118, segment 115, brush 119, conductor 151, light source 143, and through conductor 146 to supply circuit conductor 77. The intensity of the light source 143 will be zero as long as the slider 36 is maintained at or near the left hand end of the rheostat and the intensity may be increased as desired by the operator in any desired timed sequence or may be increased and decreased as called for by a light and color score and no further change in the connections will occur unless and until the slider 36 engages the bumping block 126.

If the operator desires to bring the light source 143 to full intensity he moves the slider 36 to the right hand end of the rheostat into substantially the position illustrated in Fig. 6 of the drawings and then closes the switch 147 which connects the light source 143 directly across the supply circuit conductors and in parallel-circuit relation to the resistor 27. He then moves the slider 36 to the extreme left hand end of the resistor, a movement which does not affect the intensity of the light source 143 as this has already been connected to the supply circuit conductors and is now independent of the resistor 27. By moving the slider 36 sufficiently to the left to engage the bumping block 136 and to move the lever 134 he effects a turning movement of the ratchet wheel 104 upon again moving the slider 36 to the right, as has already been described. This movement to the left and the succeeding return movement are over substantially the length of the end bar 139 and result, upon such turning movement of the ratchet wheel, in causing disengagement of the brush 119 from the arcuate segment 115, and in causing engagement of the brush 121 with the segment 114, whereby the lamp 144 is connected in series circuit relation to the resistor 27 and across the supply circuit conductors.

The operator may now selectively vary, in any volitional sequence, the intensity of this light source and if he finally desires to bring it to full brilliancy and connect it directly across the line, he moves the slider to the extreme right hand end of the resistor 27 and on the contact bar 141, after which he closes the switch 148. This connects the light source 144 directly across the supply circuit conductor. The third light source 145 may be brought up to full brilliancy in substantially the same manner.

When the three light sources have been successively brought up to full brilliancy and connected across the line the position of the ratchet wheel will be such that the brush 122 and the brush 118 are in engagement with the first half of the double-length arcuate segment 113.

If it is now desired to take the light sources off the line successively and to begin with the one last connected directly to the line, the slider 36 is moved to the right to engage the bumping block 126 and to move it and the rod 123 to the right for a distance sufficient to cause the pawl to turn the ratchet wheel 104 through an angular distance equal to one tooth. This brings the brush 118 and the brush 122 into operative engagement with the second half of the arcuate segment 113. When the slider 36 is moved back to substantially the position illustrated in Fig. 6 of the drawings the spring 125 moves the rod 123 and pawl 127 to substantially the positions illustrated. The switch 149 is opened by the operator, which opening of the switch does not however, vary or change the intensity of the light source 145. By moving the slider 36 to the left the resistance of the resistor 27 is gradually inserted in the circuit and the intensity of the light source 145 is reduced until, when the slider is at the left hand end of the rheostat, the intensity is substantially zero.

By moving the slider 36 further to the left to move the lever 134 and the rod 129 a distance sufficient to permit the pawl 137 to operatively engage the next adjacent tooth, and then moving the slider to the right over the end bar 139, the ratchet wheel 104 is moved, by the return movement of the rod 129 under the influence of the spring 132, through an angular distance equal to one tooth. This causes the segment 113 to move out from under the arm 116 and effects disengagement of the segment 113 and the brush 122, whereby the circuit through the light source 145 is interrupted. At the same time the segment 112 is operatively engaged by the brushes 118 and 121. The operator next moves the slider to the extreme right hand end of the resistor and in operative engagement with the bar 141 and then opens the switch 148. This results in the light source 144 being connected in series-circuit relation to the resistor 27, but with all of the resistance cut out of the circuit, whereby no change in the intensity of the light is made. By moving the slider to the left the intensity of this light source may be progressively reduced in any desired timed sequence, and by engaging the bumping block 136, as hereinbefore described, the light source 148 may be disconnected.

A similar series of operations will result in reducing the intensity of the light source 143 and, by causing a turning movement of the ratchet wheel 104, the position of the arm 116 relatively thereto will be such that none of the brushes engage an arcuate segment and hence none of the light sources are energized.

It may be noted that the order in which the light sources are de-energized is exactly the opposite of that in which they are energized. That is, if lamp 143 is energized first, then lamp 144, and then lamp 145, the latter will be the first to be de-energized, then lamp 144, and then lamp 143. The reason for this may be found in the following; where a plurality of lights of different colors are brought up to full intensity successively, it is desirable to first energize those lights from which the color rays of lesser quantity are being filtered through, that an amount of color rays be added into a quantity equal to the rays held in greater color quantity in artificial light. For instance it is preferable to energize two green lights before a yellow light is brought up to modify the green into yellow-green. This is for the reason that the proportionate color rays of these two colors in artificial light are as seven to fourteen as hereinbefore mentioned. It requires the blue of seven light sources to equal the red of one light source, all light sources being of equal wattage.

If one of two green lights is de-energized or reduced in quantity to the "no erg" value, after having been mixed with one yellow light, there will be no gradual change of color shade, for the reason that, as the yellow is so much stronger than the green in artificial light, it will predominate instantly in the proportion of two to one. Hence it is desirable to reverse the order of de-energization in color mixing, from that of energization, and to remove the stronger color first, if the reduction of its influence is to be gradually felt. Colors of lesser ray quantity must be cumulated through a plurality of light sources to equal colors of greater ray quantity. This is one of the many ways in which the physics of light and its effect upon the human eye has been taken account of in my system.

It is the cumulation, in successive manner, of light quantities as a means for expression that allows the economy of rheostatic and other control and effecting the compactness necessary to a light player console controlling the large quantities of illumination obligatory to color play.

While I have illustrated a particular sequence of arcuate segments and also a particular number thereof, it is evident that any desired number of segments and any desired sequence thereof may be obtained by varying the location of the arcuate segments and their number, the latter being of course directly in accordance with the number of light sources to be controlled.

The hand wheel 117 described as being secured to the normally fixed arm 116 may be employed by the operator to move the arm relatively to the ratchet wheel independently of its operation by either of the pawls. This permits, for instance, of the operator disconnecting a light source with the slider midway of the resistor 27, or of connecting another light source when the slider is in the same position, and thereby either to extinguish a light source from intermediate brilliancy, or to bring in a light source at intermediate brilliancy.

As economy of operation is of the utmost importance in light and color play, I have provided a second slider as is illustrated in Fig. 7 of the drawings so that a second light source may be variably energized over at least a portion of its intensity while a first light source is still connected in series circuit relation to the resistor. If for instance, a light source producing a light of a given color is to remain at or near its maximum brilliancy, as for instance, the light source 166 in Fig. 7, it is possible to variably energize a second light source 168, either of white light or of a different color of light, and to control its energization by the second slider 154.

The end bar 139 may, for instance, be connected to the terminals of the socket member 189 and the light source 168 may be connected to the contact pins of the plug 191. By inserting the plug 191 in the socket 189 the light source is connected to the resistor 27. The operator may move the slider 154 toward the right hand end of the resistor to include a relatively large amount of resistance thereof in circuit if the light source 168 is to be brought in dim. By closing the switch 169 the light source 168 is energized and its intensity may then be varied as desired by the operator by moving the slider 154.

The above described method of operation is, of course, subject to the condition that it be not required that the second light source be brought in at zero brilliancy, which requirement would mean that the second slider 154 controlling the second light source be moved to the extreme right hand end of its travel to a position already occupied by the slider 36. In general the intensities of the two light sources must be such that the two sliders will not interfere with each other in their positions on the slider bar.

Figure 14:
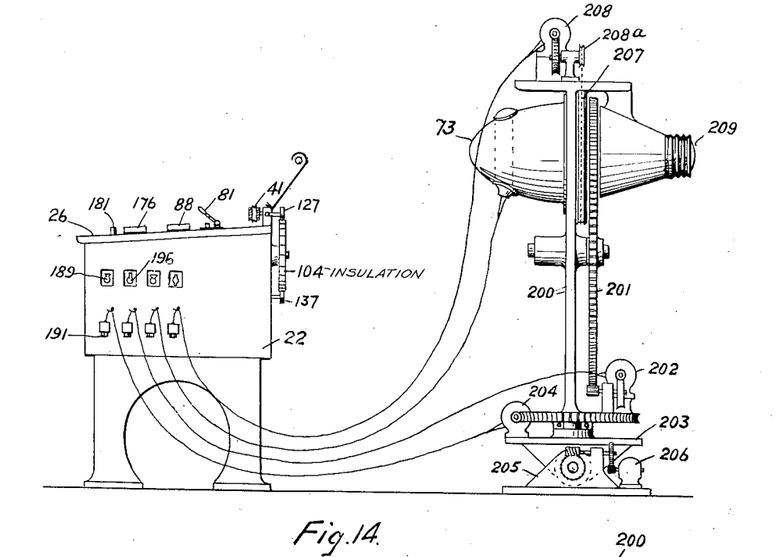
Fig. 14 shows the combinations defined in a single figure.
Figure 15:
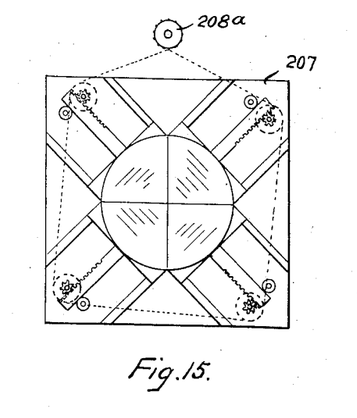
Figure 16:
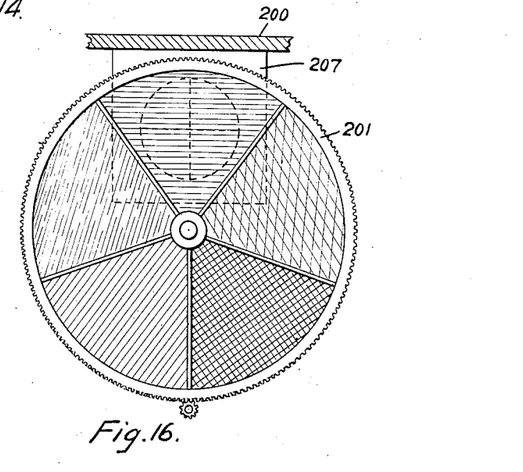

As has hereinbefore been described the light sources 65, 66, 67, 68, 69, 71, and 72 may be located in any desired spacial relation and distant from the light player console and may be provided with a plurality of motors to permit of varying not only the size but also the direction of the beam of light produced thereby as well as the color of the light and the extension of the illumination as shown in Fig. 14. The plural-position tablet switches 173, 174, 175, and 176 permit of varying the direction of operation of the respective motors controlled thereby, whereby a movement of the lamp actuated thereby may be effected in an up and down direction, to the right or to the left; the lateral area of the beam of light may be varied as well as the color of the light.

The operating lever 182 is arranged to be depressed by the finger of an operator touching the button 177, and the greater the pressure exerted by the operator on the button 177, the greater will be the effect produced by the motor, that is, the greater the pressure exerted on the operating lever of the control switch, the more resistance is cut out of the circuit, and the faster will the motor operate to effect the desired change. If desirable or necessary the lever 182 may be depressed to any desired position and may be held there by the action of the ratchet 187 for such a length of time as may be necessary to complete the desired change at the rate determined by the amount of resistance cut out of the circuit of the motor.

This feature I consider very valuable as the results obtained by the operator are directly in accordance with the pressure exerted by him on the operating button 177, which is resiliently held or restrained by the spring 186. This feature of operation provides a variable timing factor which interacts to the muscular feel, that is of great value in the control of the various light sources and the changes to be effected therein and places the execution of these changes under the volitional control of the operator as a vehicle of expression.

In my co-pending application Serial No. 670,432, filed October 24, 1923, entitled "Means for controlling light" I have disclosed and claimed a motor-operated means for varying the color of a beam of light, which means is provided with variable timing factor means. If desired one of the hereinbefore described light sources 65 to 72 may be of the type disclosed and claimed in my application Serial No. 670,432 and having the added features of a motor-actuated iris diaphragm. However, I prefer to employ a light source that is movable in a plurality of different directions as such movement makes possible the illumination of varying spaces or areas from one light source.

Various modifications may be made in the system and devices embodying my invention without departing from the spirit and scope thereof, and I desire to include all such modifications in the appended claims.

I claim as my invention:

1. In a system of the kind recited, in combination, an electrically-energized light source, connecting means swingable across the current varying means, and across the line for said light source, manually operated, means for varying the current traversing said light source, and a plural-position tilting tablet switch for interconnecting said current-varying means in series-circuit relation or in parallel-circuit relation to said light source without interrupting the current flow therethrough and springs connected to said switch and adapted to yieldingly resist movement of said switch.

2. In a system of the kind recited, in combination, a light source, a single manually operated slider-controlled resistor for varying the intensity of said light source, a second light source, and a second slider co-operating with the unused portion of said single resistor for discretely merging the intensity gradations of said light sources.

3. In a system of the kind recited, in combination, a light source, an extended resistor, a manually-controlled wheel mounted slider co-operating with said resistor to permit of selectively varying the intensity of said light source in volitional time sequence, a second light source, and a second manually-controlled slider co-operating with said resistor to permit of discretively varying the intensity graduations of said light sources in volitional time sequence, and with individuality of control.

In testimony whereof, I have hereunto subscribed my name this 20th day of December, 1923.

MARY HALLOCK GREENEWALT.